May 2, 1950

E. C. ISOM

COMPUTER

Filed Sept. 14, 1946

2,506,299

INVENTOR
Elbert C. Isom
BY
Pennie, Edmonds, Morton & Barrows
ATTORNEYS

Patented May 2, 1950

2,506,299

UNITED STATES PATENT OFFICE 2,506,299

COMPUTER

Elbert C. Isom, Garden City, N. Y.

Application September 14, 1946, Serial No. 697,051

3 Claims. (Cl. 235—61)

This invention relates to navigational computers and has for its object the provision of an improved computer for air or surface navigation. More particularly, the invention provides a computer with a flat base having superimposed on its obverse face an off-course grid and a drift grid both having a common center line or true index, and a compass-rose pivotally mounted at its center on the center line and over the obverse face of the base. The compass-rose is formed of a flat sheet of transparent material through which the grids are visible and has a suitable roughened exterior surface for marking with a pencil to work out navigational problems.

The drift grid comprises radial lines reading in degrees, plus on one side of the center line, minus on the other side of the center line, and concentric lines originating from the same center as the radial lines marked in convenient units of distance measure indicating speed in miles per hour, or distance traveled or to be made good from or to any given point. The superimposed off-course grid is laid out in squares, one set of lines being parallel to the center line or index, which is the zero radial line of the drift grid, equally spaced on both sides thereof, and another set of lines at right angles to the center line, the lines in both directions representing convenient units of distance measure, for example, miles.

Advantageously, the off-course grid and drift grid are superimposed on each other on a sheet of flat and suitably stiff material, and a pivot opening or bearing for the compass-rose is provided in the sheet embracing the central line for the grids, forming a means for rotatably mounting the compass-rose on its axis.

In combination with a pivot or hub for the compass-rose, I find it advantageous to mount a circular slide-rule for computing such things as air-speed, distance, and fuel values, together with pressure-altitude and air-speed corrections.

These and other novel features of the invention will be better understood after considering the following discussion taken in conjunction with the accompanying drawing, in which—

Figure 1:
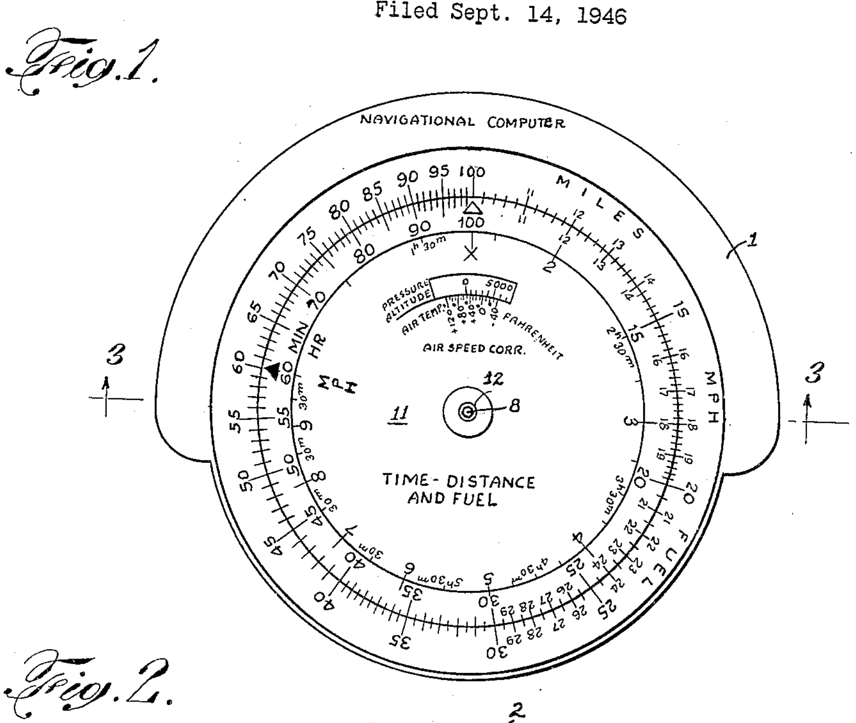
Fig. 1 is a plan view of the reverse side of a navigational computer embodying the invention.
Figure 2:
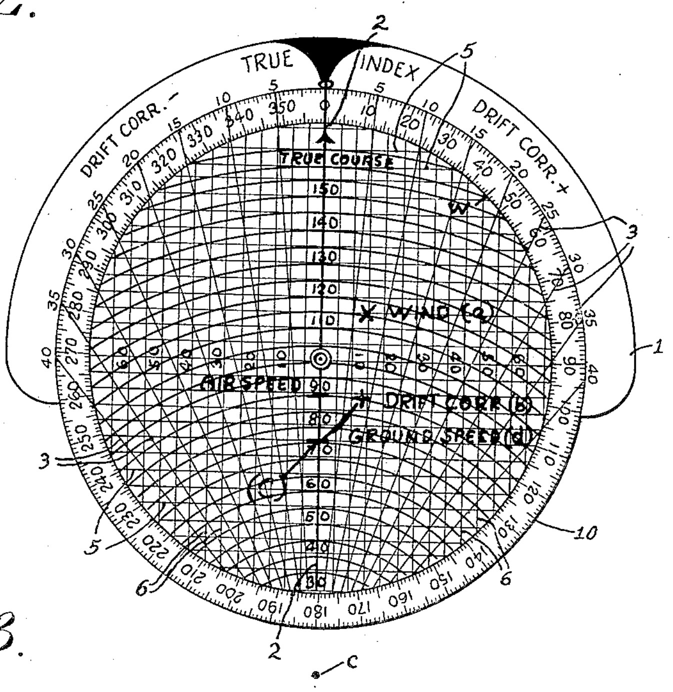
Fig. 2 is a plan view of the obverse side of the instrument of Fig. 1.
Figure 3:
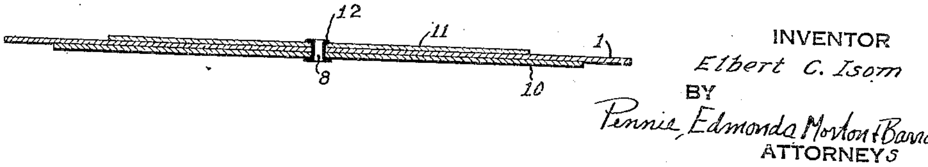
Fig. 3 is a view taken along line 3—3 of Fig. 1.

The navigational computer of the invention illustrated in the drawings comprises a somewhat circular and flat base 1, formed of any suitable stiff and hard material such as metal, or a plastic like Celluloid which is preferably opaque and colored or pigmented. The base should be sufficiently stiff or rigid that it maintains its shape and size; however, it may be somewhat flexible. I may, for example, use one sheet for support on which the lines and markings are made and bond over this a layer of clear plastic such as Celluloid or a methacrylate to protect the lines and markings from wear. The base is marked along its center with a center line or true index 2 (also radial) which intersects a common center C beyond the edges of the base. The drift grid is laid out with radial lines 3 extending from this center on both sides of line 2, those to the left indicating minus or left drift corrections, and those to the right plus or right drift corrections. For convenience, the radial lines are selected to represent 5°. These radial lines converge at the center C. The other component of the drift grid is the group of equally spaced concentric arcs having the same center as the radial lines and marked from 30 to 170 representing miles per hour or miles of distance, depending upon the type of problem to be solved. The range of 30 to 170 miles was selected to cover the ordinary speeds of private and commercial planes and the winds usually encountered. With faster planes operating at, say, 200 miles per hour air speed, the range would be from 130 to 270 miles per hour and accurate lines marked accordingly, or for any desired range suitable to the speed range of the type of aircraft in which the computer is to be used.

The off-course grid as laid out on the face of the base 1 in square pattern comprises equally spaced lines 5 at right angles to center line 2, each representing five miles, and equally spaced lines 6 parallel to center line 2, also representing 5 miles. This latter grid is used mainly for referring wind vector to air speed curve and for working off-course problems.

The center hole 8 in the base embraces the center line 2 and is preferably located midway between the inner and outer arcs which, in the case of the computer illustrated, is between the 30 mile and the 170 mile arcs.

The compass-rose 10 is preferably formed of thin, flat, stiff and transparent sheet material of any suitable plastic and has an axis pin or hub at its center which engages the hole 8 in the base member. The compass-rose is marked at degree intervals as usual around the periphery and the front face is preferably ground or roughened so it may be marked with a soft pencil.

On the reverse side of the computer, I prefer to mount a disc 11 as the movable element of a circular slide rule on the same pin or hub. Advantageously, I use the rivet 12 as a hub and connecting member for the base, compass-rose and slide rule member. The circular slide rule 11 is in the usual form and the logarithms of numbers thereon may be marked to represent miles, fuel, minutes, or miles per hour as required. In fact, the slide rule may be omitted if desired without impairing the operation of the obverse side.

The computer may be operated as follows:

Given the true wind and the true air speeds, determine the ground speed and drift correction:

(*a*) Set the true wind (degrees on the compass rose) over the true index 2 and mark a small cross over the true index line coincident with the wind velocity represented by one of the concentric arcs.

(*b*) Set the true course on the compass rose to the true index 2 on the base and note the distance of the wind cross right or left of the true index line on the compass rose. Mark a line along the true air speed curve and mark a short vertical cross on the true air speed curve a distance equal to that of the wind cross right or left of the true index line.

(*c*) Again set the true wind on the compass rose at the true index and from the cross on the air speed curve draw on the compass rose a line of indefinite length with the direction of the wind and parallel to lines 6.

(*d*) Set the true course on the compass rose at the true index and under the cross on the true air speed curve, read the drift correction in degrees plus or minus. Under intersection of line (*c*) and the true index line read the ground speed.

*Example.*—Wind from 45 degrees, 20 miles an hour, true course zero degrees, true air speed 90 miles an hour. Required, the drift correction and the ground speed.

(*a*) Set the true wind (45 degrees on the compass rose) to the true index and from the center pivot towards 45 degrees mark a small cross *a* on the true index line at a point 20 miles distant (velocity of wind) from the center pivot, in this case at the intersection of the 120 mile curve since the center point is located at the 100 mile curve.

(*b*) Set the true course (zero degrees) to the true index. Note that the wind cross *a* now falls 13 miles to the right of the true index line. On the compass rose over the true air speed curve (90 miles an hour) mark a second cross *b* and 13 miles to the right of the true index line.

(*c*) Again set the true wind (45 degrees) to the true index and from the cross *b* draw a line to *c* of indefinite length with the direction from which the wind is blowing and parallel to grid lines 6.

(*d*) Reset the true course (zero degrees) to the true index and at the point that the line from *c* to *b* crosses the true index line read 75 miles per hour ground speed. By referring the cross *b* to the drift grid line 3 read drift correction of plus 8 degrees.

In working a radius of action problem the above procedure will give ground speed out (GSO). To determine ground speed back (GSB) set a reciprocal course (180 degrees) to the true index and proceed as above. Multiply GSB by GSO and add GSB plus GSO. On the reverse side of the instrument set GSB plus GSO on the time scale under GSB times GSO on the mile scale and over 100 on the time scale read radius of action per hour (in miles) on the mile scale. Over hours and decimal fraction of hours of available fuel on the numerical time scale read total radius of action on the mile scale.

Off-course problems may be worked on this instrument by direct reading without any setting whatsoever.

*Example.*—If after flying 50 miles on a 150 mile cross-country trip the plane is 10 miles to the right of the course, mark a small cross at the intersection of lines 5 and 6 at 50 miles on the air speed curve exactly 10 miles to the right of the true index line. Referring this cross to the drift grid, it will be noted that a 12 degree change of course to tse left will parallel the desired true course. However, there are 100 miles to go. Therefore, to arrive at the desired destination, an additional change of course to correct is required. Make another cross on the 100 mile curve at exactly 10 miles to the right of the course. This, by reference to the drift grid, is 6 degrees to the right. Therefore, since 12 degrees change of course to the left was necessary to parallel the desired true course at 50 miles from the point of departure, an additional 6 degrees to the left will be required to arrive exactly at the destination in the next 100 miles, or a total change of course of 18 degrees to the left.

Determination of an unknown wind may be worked as follows. Pick out any 2 land marks that fall on the true course line and fly from one of these to the other carefully noting the number of degrees drift correction required to hold the true course and time the flight over the ground between the 2 objects in order to determine the exact ground speed. Set the computer to the desired true course and on the true index line mark a small cross at the ground speed. Now, make another cross on the air speed curve at the number of the degrees drift correction required to make a track equal the true course. Connect these two crosses with a line and turn the computer until that line is parallel to one of the lines 6. The true wind may then be read under the true index and the velocity of the wind will be equal to the distance between the 2 crosses.

*Example.*—True course zero, true air speed 90 miles an hour, ground speed 75 miles per hour, drift correction plus 8 degrees. Required, the direction and the velocity of the true wind.

*Solution.*—Set zero degrees to the true index. Mark a small cross on the true index line at 75 miles. Mark a small cross on the air speed curve at 8 degrees plus the drift correction. Connect these two crosses with a line. Rotate the computer until this line is parallel with lines 6. Under the true index read 45 degrees, the direction from which the true wind is blowing. The distance between the two crosses on the off-course grid (lines 5 and 6) equals 20 miles, the velocity of the true wind in miles per hour.

I claim:

1. A navigational computer which comprises a base of thin flat material having an obverse face with a center line thereon, a drift grid on the obverse face having a radial line coincident with the center line and a plurality of other radial lines equally spaced on both sides of the center line, a rectangular off-course grid on the obverse face with one of its lines coincident with the center line, a translucent compass-rose, and means for mounting the compass-rose rotatable about a fixed axis on the center line whereby the compass-rose may be rotated over the grids.

2. A navigational computer which comprises a base of thin flat material having an obverse face with a center line thereon, a drift grid on the obverse face having a radial line coincident with the center line and a plurality of other radial lines equally spaced on both sides of the center line, a common center for the radial lines, a plurality of concentric equally spaced arcs for the drift grid concentric with the common center, an off-course grid in square pattern on the obverse face with one of its lines coincident with the center line, a translucent compass-rose through which both grids are visible, a fixed axis means for the base on the center line and approximately midway between the arcs, and means for mounting the compass-rose at its center on the fixed axis for rotation with respect to the base, said compass-rose having a surface suitable for marking to work out problems.

3. A navigational computer which comprises a base having an obverse face on which a drift grid is superimposed upon an off-course grid, the drift grid comprising a center line which intersects a common center, a plurality of radial lines originating at the common center representing degrees plus on one side of the center line and degrees minus on the other side of the center line, a plurality of equally spaced arcs representing units of distance concentric with the common center, the off-course grid comprising equally spaced lines in square pattern representing the same units of distance, one of the lines being coincident with the center line, a pivot point on the center line and approximately midway between the arcs, a compass-rose of translucent sheet material pivotally mounted at the pivot point over the grids, and a surface on the compass-rose for marking with a pencil to work out problems.

ELBERT C. ISOM.

REFERENCES CITED

The following references are of record in the file of this patent:

"Practical Air Navigation," by Thoburn C. Lyon, September, 1940, Civil Aeronautics Bulletin No. 24.